United States Patent
Homma et al.

(10) Patent No.: US 11,432,057 B2
(45) Date of Patent: Aug. 30, 2022

(54) COMMUNICATION DEVICE AND SWITCHING METHOD

(71) Applicant: Nippon Telegraph and Telephone Corporation, Tokyo (JP)

(72) Inventors: Shunsuke Homma, Tokyo (JP); Shinya Kawano, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/263,592

(22) PCT Filed: Jul. 31, 2019

(86) PCT No.: PCT/JP2019/030020
§ 371 (c)(1),
(2) Date: Jan. 27, 2021

(87) PCT Pub. No.: WO2020/027198
PCT Pub. Date: Feb. 6, 2020

(65) Prior Publication Data
US 2021/0314683 A1    Oct. 7, 2021

(30) Foreign Application Priority Data
Aug. 2, 2018 (JP) .............................. JP2018-146223

(51) Int. Cl.
*H04Q 11/00* (2006.01)
*H04L 12/46* (2006.01)

(52) U.S. Cl.
CPC ..... *H04Q 11/0067* (2013.01); *H04L 12/4641* (2013.01); *H04Q 2011/0064* (2013.01); *H04Q 2011/0079* (2013.01)

(58) Field of Classification Search
CPC ....... H04Q 11/0067; H04Q 2011/0064; H04Q 2011/0079; H04L 12/4641
See application file for complete search history.

(56) References Cited

U.S. PATENT DOCUMENTS

2005/0025160 A1*  2/2005  Meier ............... H04L 12/4641
                                                    370/395.53
2006/0039390 A1*  2/2006  Boyd ................ H04L 12/4641
                                                    370/404
(Continued)

FOREIGN PATENT DOCUMENTS

JP    2013-46175    3/2013
JP    2014154966    8/2014

OTHER PUBLICATIONS

Farinacci et al., "Anycast-RP Using Protocol Independent Multicast (PIM)," Network Working Group, Aug. 2006, 12 pages.
(Continued)

*Primary Examiner* — Dzung D Tran
(74) *Attorney, Agent, or Firm* — Fish & Richardson P.C.

(57) ABSTRACT

An optical line terminal (OLT) detects content distribution conditions in terminals, and performs control for performing switching to distribution to each terminal using an individual virtual local area network (VLAN) or distribution to a plurality of terminals by broadcasting using a broadcasting VLAN, in accordance with the detected content distribution conditions. The OLT detects that the number of viewers of a predetermined channel exceeds a predetermined threshold value or is less than the predetermined threshold value, as the content distribution conditions. Further, the OLT performs switching to distribution using a broadcasting VLAN in a case where it is detected that the number of viewers of the predetermined channel exceeds the predetermined threshold value, and performs switching to distribution using an individual VLAN in a case where it is detected that the number of viewers of the predetermined channel is less than the predetermined threshold value.

4 Claims, 12 Drawing Sheets

(56) References Cited

U.S. PATENT DOCUMENTS

2008/0123621 A1* 5/2008 Bachmutsky ....... H04W 12/033
                                                    370/351
2012/0259994 A1* 10/2012 Gillies ................. H04L 12/189
                                                    709/231

OTHER PUBLICATIONS

Vida et al., "Multicast Listener Discovery Version 2 (MLDv2) for IPv6," Network Working Group, Jun. 2004, 62 pages.

* cited by examiner

| CHANNEL | NUMBER OF VIEWERS |
|---------|-------------------|
| A | 10 |
| B | 20 |
| | |

COMMUNICATION DEVICE AND SWITCHING METHOD

CROSS-REFERENCE TO RELATED APPLICATIONS

This application is a National Stage application under 35 U.S.C. § 371 of International Application No. PCT/JP2019/030020, having an International Filing Date of Jul. 31, 2019, which claims priority to Japanese Application Serial No. 2018-146223, filed on Aug. 2, 2018. The disclosure of the prior application is considered part of the disclosure of this application, and is incorporated in its entirety into this application.

TECHNICAL FIELD

The present disclosure relates to a communication device and a switching method.

BACKGROUND ART

In recent years, services for downloading content through networks such as the Internet have become widespread. The content is videos and the like that are large-capacity data. For this reason, downloading of content requires a large network load because large-capacity data is transmitted and a large amount of bandwidth is used. Consequently, there is a technique for distributing network loads by a multicast distribution system at the time of downloading content.

The multicast distribution system includes an edge copy distribution system and an optical line terminal (OLT) copy distribution system. The edge copy distribution system is a system in which an edge copies a packet and distributes the packet to a user who has transmitted a viewing request. In the edge copy distribution system, a channel having no viewers is not distributed, and thus a band of a low audience rating channel is used more efficiently than in the OLT copy distribution system.

In addition, the OLT copy distribution system is a system in which distribution is performed by broadcasting packets in an OLT and controlling a filter of an optical network unit (ONU). In the OLT copy distribution system, overlapping transmission does not occur between an edge router and an OLT for a high audience rating channel, and thus a band of a high audience rating channel is used more efficiently than in the edge copy distribution system.

CITATION LIST

Non Patent Literature

NPL 1: "Multicast Listener Discovery Version 2 (MLDv2) for IPv6," [online], [retrieved Jul. 11, 2018], Internet <https://tools.ietf.org/html/rfc3810>

NPL 2: "Anycast-RP Using Protocol Independent Multicast (PIM)". [online], [retrieved Jul. 11, 2018], Internet <https://tools.ietf.org/html/rfc4610>

SUMMARY OF THE INVENTION

Technical Problem

However, in the multicast distribution system described above, there is a problem in that content distribution may not be efficiently performed depending on viewing conditions. That is, in the edge copy distribution system described above, when the number of viewers increases, a processing load due to copying increases. Further, in the OLT copy distribution system described above, a band of an access section is consumed at all times, and thus a band usage rate is reduced when there are a large number of channels that have fewer viewers. Note that, in the related art, the edge copy distribution system and the OLT copy distribution system have different distribution mechanisms such as different VLANs to be used, and thus switching cannot be performed.

Means for Solving the Problem

In order to solve the problems described above and achieve an object, a communication device according to the present disclosure includes a detection unit that detects content distribution conditions in terminals, and a control unit that performs control for performing switching to distribution to each terminal using an individual VLAN or distribution to a plurality of terminals by broadcasting using a broadcasting VLAN, in accordance with the content distribution conditions detected by the detection unit.

In addition, a switching method of the present disclosure is a switching method executed by a communication device including detecting content distribution conditions in terminals, and performing control for performing switching to distribution to each terminal using an individual VLAN or distribution to a plurality of terminals by broadcasting using a broadcasting VLAN, in accordance with the content distribution conditions detected in the detecting of the content distribution conditions.

Effects of the Invention

According to the present disclosure, an effect of making it possible to efficiently distribute content in accordance with viewing conditions is exhibited.

DESCRIPTION OF EMBODIMENTS

Hereinafter, embodiments of a communication system and a switching method according to the present application will be described in detail with reference to the drawings. Note that the present disclosure is not limited to the communication system and the switching method of the embodiment.

First Embodiment

In the following embodiment, a configuration of a communication system, a configuration of a notification device, and a flow of processing in the notification device according to the first embodiment will be described sequentially, and effects according to the first embodiment will be described lastly.

Configuration of Communication System

Figure 1:
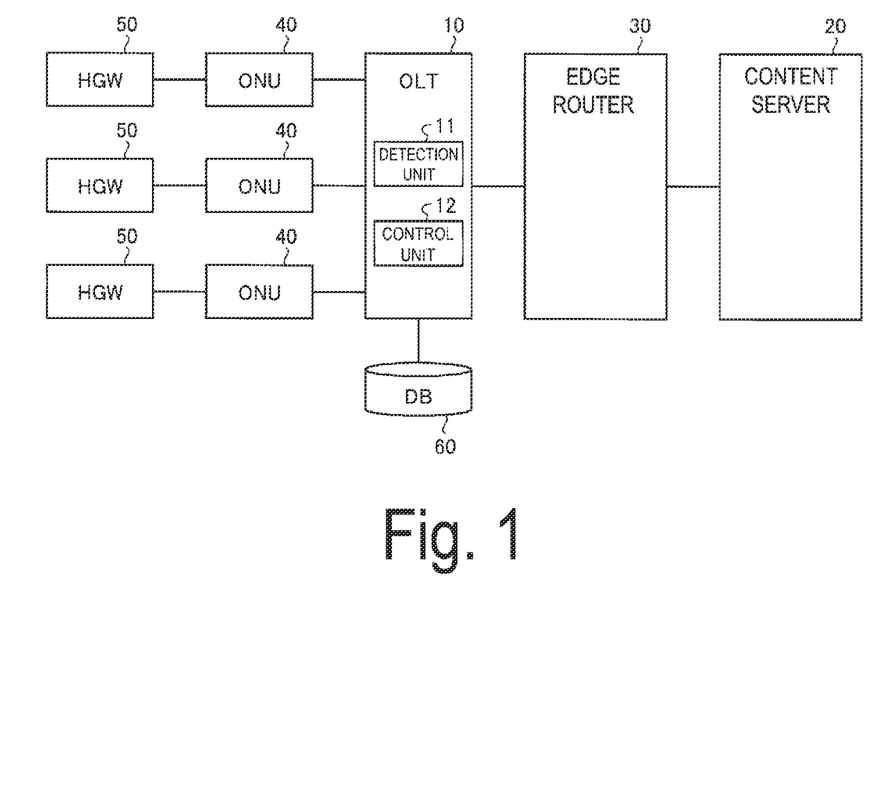
FIG. 1 is a diagram showing an example of a configuration of a communication system according to a first embodiment.

First, a configuration of the communication system according to the first embodiment will be described using FIG. 1. FIG. 1 is a diagram showing an example of a configuration of the communication system according to the first embodiment. The communication system according to the first embodiment includes an OLT 10, a content server 20, an edge router 30, a plurality of optical network units (ONUs) 40, a plurality of home gateways (HGWs) 50, and a database (DB) 60. Note that the number of devices shown in FIG. 1 is merely an example and the number is not limited thereto.

Figure 2:
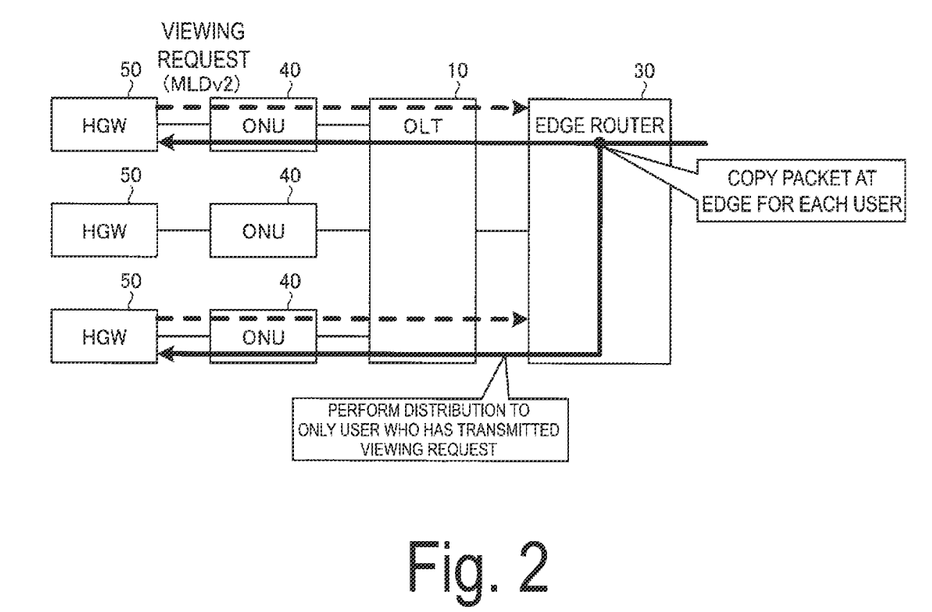
FIG. 2 is a diagram showing an edge copy distribution system.
Figure 3:
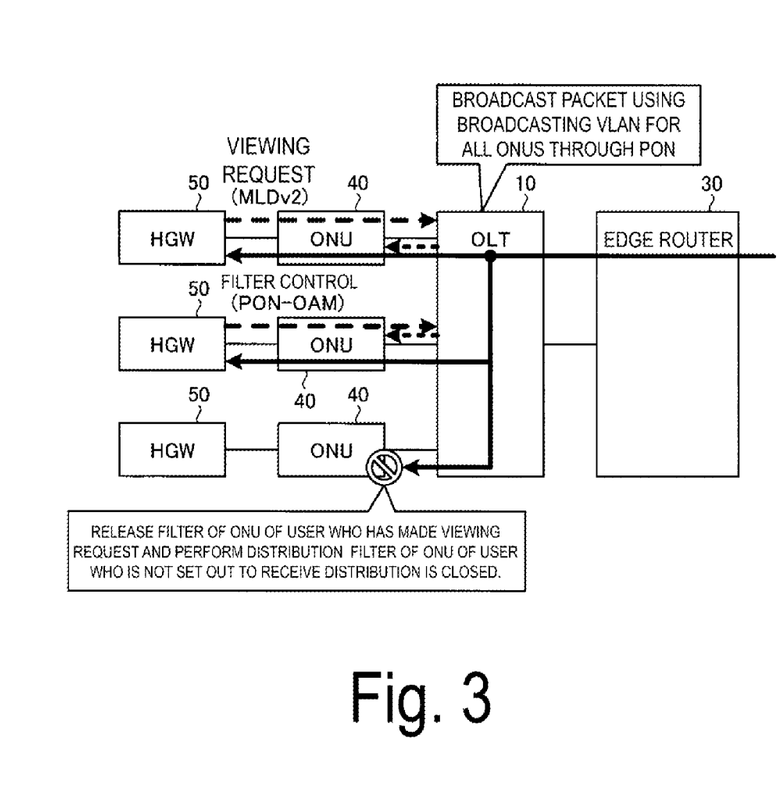
FIG. 3 is a diagram showing an OLT copy distribution system.

In the communication system according to the first embodiment, an edge copy distribution system and an OLT copy distribution system are switched in accordance with viewing conditions. Here, the edge copy distribution system and the OLT copy distribution system will be described using FIGS. 2 and 3. FIG. 2 is a diagram showing the edge copy distribution system. FIG. 3 is a diagram showing the OLT copy distribution system.

As shown in FIG. 2, the edge copy distribution system is a system in which the edge router 30 copies a packet for each user and distributes the packet only to a user who has transmitted a viewing request. For this reason, a channel having no viewers is not distributed, and thus a band of a low audience rating channel is efficiently used. In addition, as shown in FIG. 3, in the OLT copy distribution system, packets are broadcast through a broadcasting VLAN for all ONUs 40 in the OLT 10 of a passive optical network (PON). Further, in the ONU 40, a filter of an ONU of a user who has transmitted a viewing request is opened, an ONU of a user who is not set out to receive a distribution closes a filter, and thereby distributing channels to only users who have transmitted a viewing request.

Returning to the description of FIG. 1, the OLT 10 is a station-side termination device and is a relay device that accommodates the ONUs 40. The OLT 10 includes a detection unit 11 and a control unit 12. The detection unit 11 detects content distribution conditions in each terminal. Specifically, the detection unit 11 detects that the number of viewers of a predetermined channel exceeds a predetermined threshold value or that the number of viewers of the predetermined channel is less than the predetermined threshold value, as the content distribution conditions. Note that, regarding the predetermined threshold value, a threshold value can be set for each channel, and the threshold value is not limited to the number of viewers (for example, control according to a consumption band is performed, or the like).

The control unit 12 performs control for performing switching to distribution to each terminal using an individual VLAN or distribution to a plurality of terminals by broadcasting using a broadcasting VLAN, in accordance with the content distribution conditions detected by the detection unit 11. Specifically, in a case where the detection unit 11 detects that the number of viewers of the predetermined channel exceeds the predetermined threshold, the control unit 12 requests the edge router 30 to start distribution using the broadcasting VLAN and to stop distribution using individual VLANs. Further, in a case where the detection unit 11 detects that the number of viewers of the predetermined channel is less than the predetermined threshold, the control unit 12 requests the edge router to start distribution using individual VLANs and to stop distribution using a broadcasting VLAN.

For example, the OLT 10 snoops (multicast listener discovery (MLD) snooping) the start or stop of a received viewing request and notifies the DB 60, managing a channel being distributed and the number of viewers thereof, of the terminal and viewing channel information.

In addition, when the OLT 10 receives a threshold value excess notification indicating that the number of viewers of the channel exceeds a threshold value X from the DB 60, the OLT 10 requests the edge router 30 to stop distribution using an individual VLAN and start distribution using a broadcasting VLAN. Further, when the OLT 10 receives a threshold value reduction notification indicating that the number of viewers of the channel is less than the threshold value X from DB 60, the OLT 10 requests the edge router 30 to perform distribution using an individual VLAN of a terminal by which viewing is being performed and also transmits a request for closing a broadcasting VLAN to the edge router 30.

The content server 20 is a server that distributes content. The edge router 30 starts distribution using an individual VLAN and stops distribution using a broadcasting VLAN or stops distribution using an individual VLAN and starts distribution using a broadcasting VLAN in response to a request received from the OLT 10. In addition, the edge router 30 can perform multicast distribution using both a broadcasting LAN set up between the plurality of HGWs 50 and an individual LAN set up between the HGWs 50 and can allow LAN ports to be opened and closed in response to a request.

The ONU 40 is a subscriber termination device installed in a user's home and is accommodated in the OLT 10. The ONU 40 is connected to a terminal (not shown) in a wireless or wired manner. The HGW 50 is a device installed in a user's home in order to achieve a service in a home network.

Figure 4:
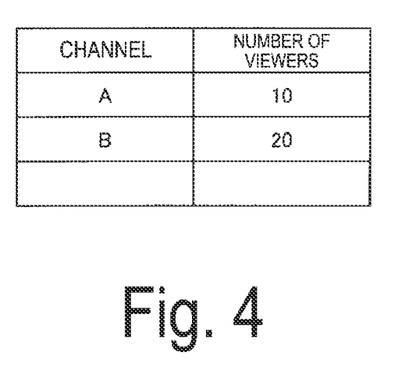
FIG. 4 is a diagram showing an example of a table stored in a DB.

The DB 60 manages viewing conditions of a terminal under the OLT 10. Note that the OLT may include a dedicated DB 60. The DB 60 stores the number of viewers of each channel. For example, the DB 60 stores a table in which a channel and the number of viewers are associated with each other, as shown in FIG. 4. FIG. 4 is a diagram showing an example of a table stored in a viewer information storage unit.

The DB 60 notifies the OLT 10 of a threshold value excess notification when the number of viewers of any one channel increases beyond a preset threshold value X. In addition, the DB 60 notifies the OLT 10 of a threshold value reduction notification when the number of viewers of any one channel decreases below the threshold value X.

Figure 5:
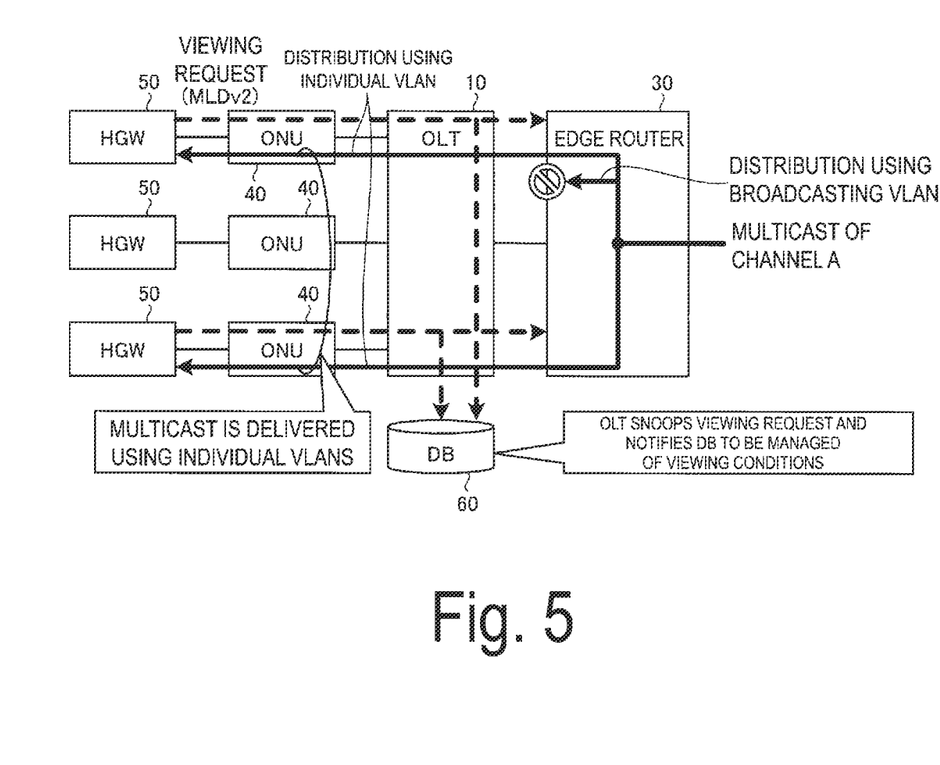
FIG. 5 is a diagram showing a process of performing switching from edge copy distribution to OLT copy distribution.
Figure 6:
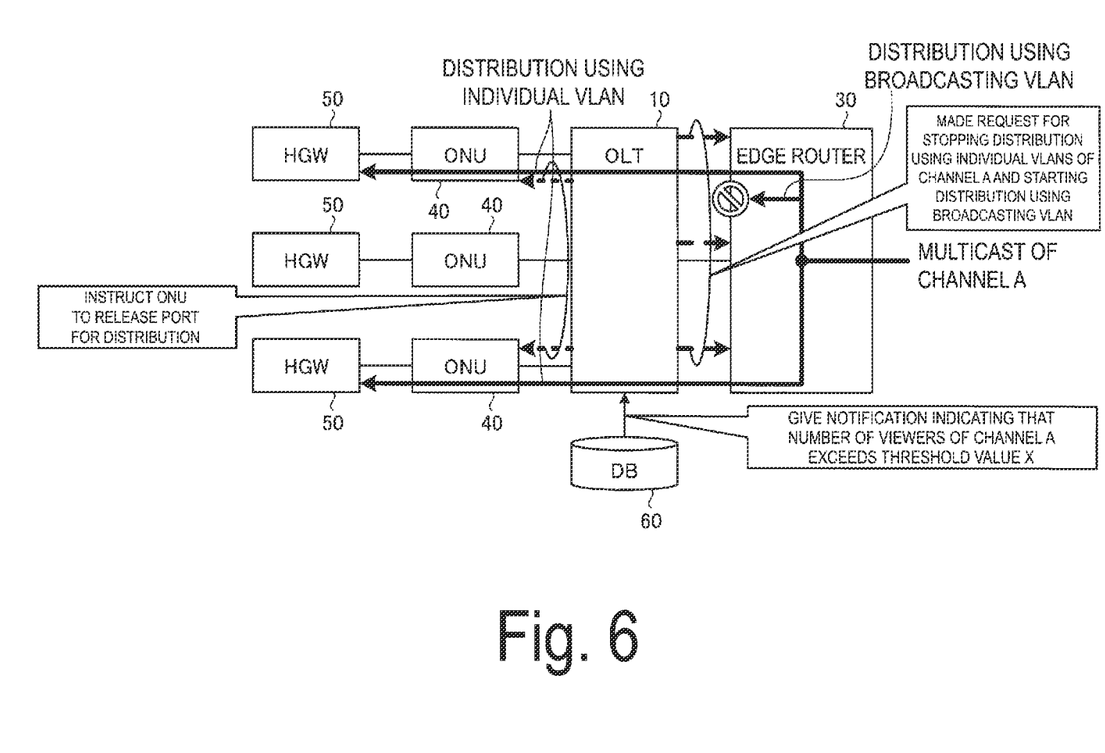
FIG. 6 is a diagram showing a process of performing switching from edge copy distribution to OLT copy distribution.
Figure 7:
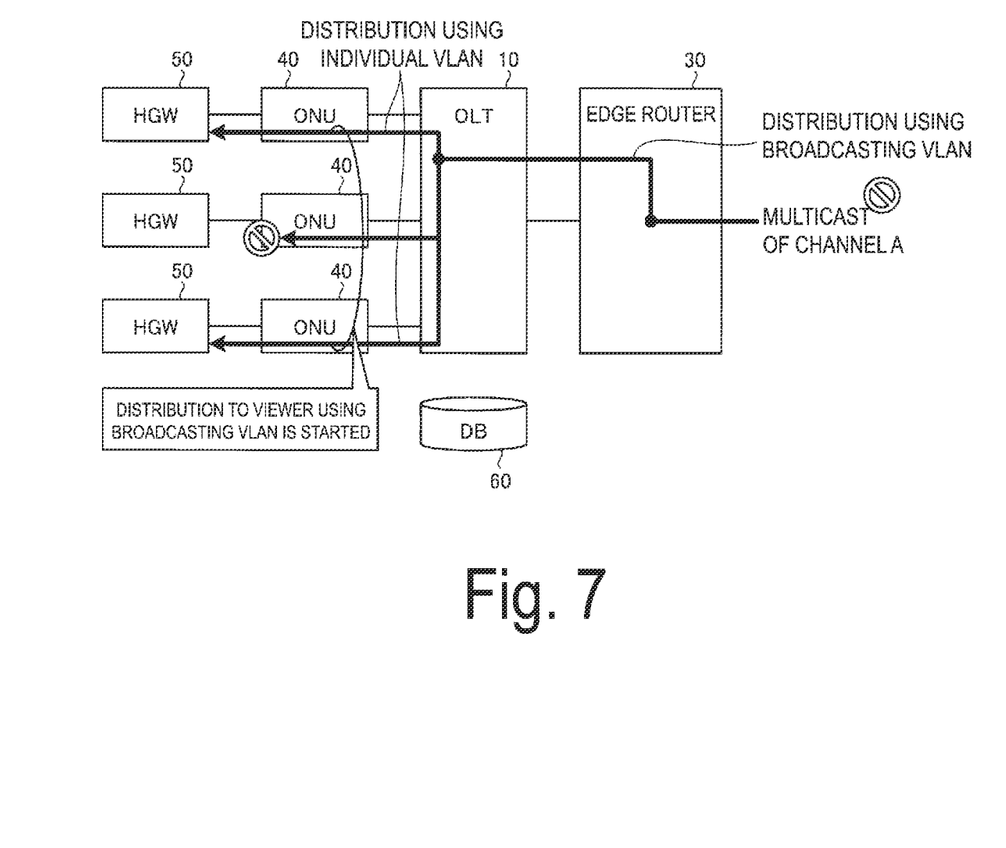
FIG. 7 is a diagram showing a process of performing switching from edge copy distribution to OLT copy distribution.

Here, a process of performing switching from edge copy distribution to OLT copy distribution will be described using FIGS. 5 to 7. FIGS. 5 to 7 are diagrams showing a process of performing switching from edge copy distribution to OLT copy distribution. As shown in FIG. 5, the OLT 10 snoops (MLD snooping) the start and stop of a viewing request and notifies the DB 60, managing a channel being distributed and the number of viewers thereof, of the terminal and viewing channel information. In addition, when the number of viewers of a channel A does not exceed the threshold value X, the edge router 30 distributes multicast for the channel A using an individual VLAN.

Thereafter, as shown in FIG. 6, the DB 60 notifies the OLT 10 of a threshold value excess notification in a case where the number of viewers of the channel A exceeds the threshold value X. In addition, the OLT 10 requests the edge router 30 to stop distribution using an individual VLAN of the channel A and start distribution using a broadcasting VLAN, and instructs the ONU 40 to open a port for distribution. In addition, as shown in FIG. 7, when OLT copy distribution is performed, distribution to a viewer is started using a broadcasting VLAN.

Figure 8:
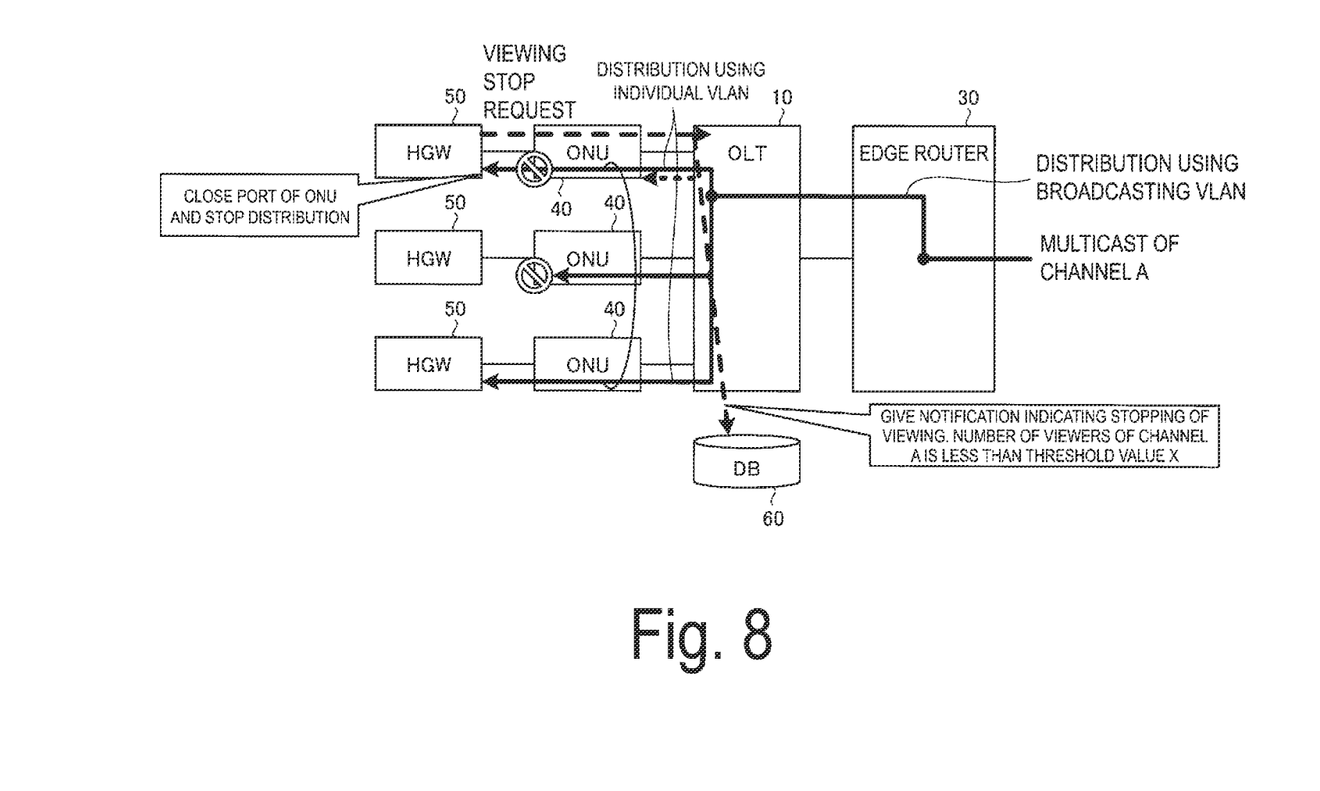
FIG. 8 is a diagram showing a process of performing switching from OLT copy distribution to edge copy distribution.
Figure 9:
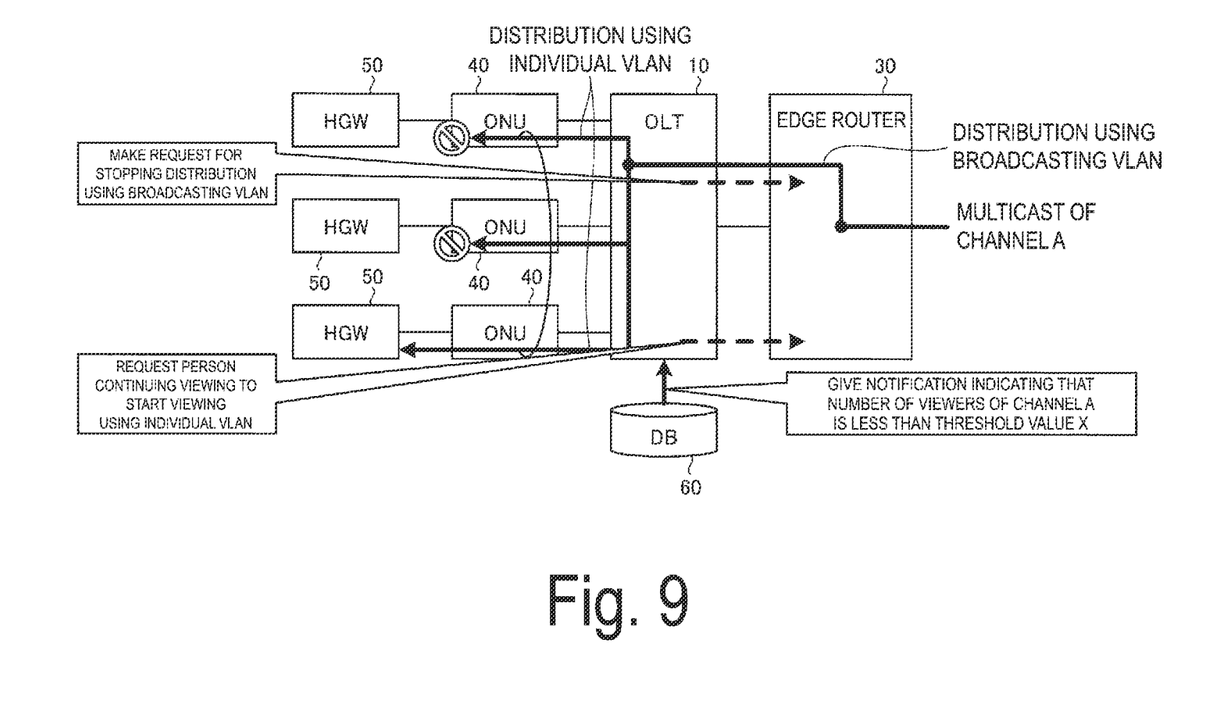
FIG. 9 is a diagram showing a process of performing switching from OLT copy distribution to edge copy distribution.
Figure 10:
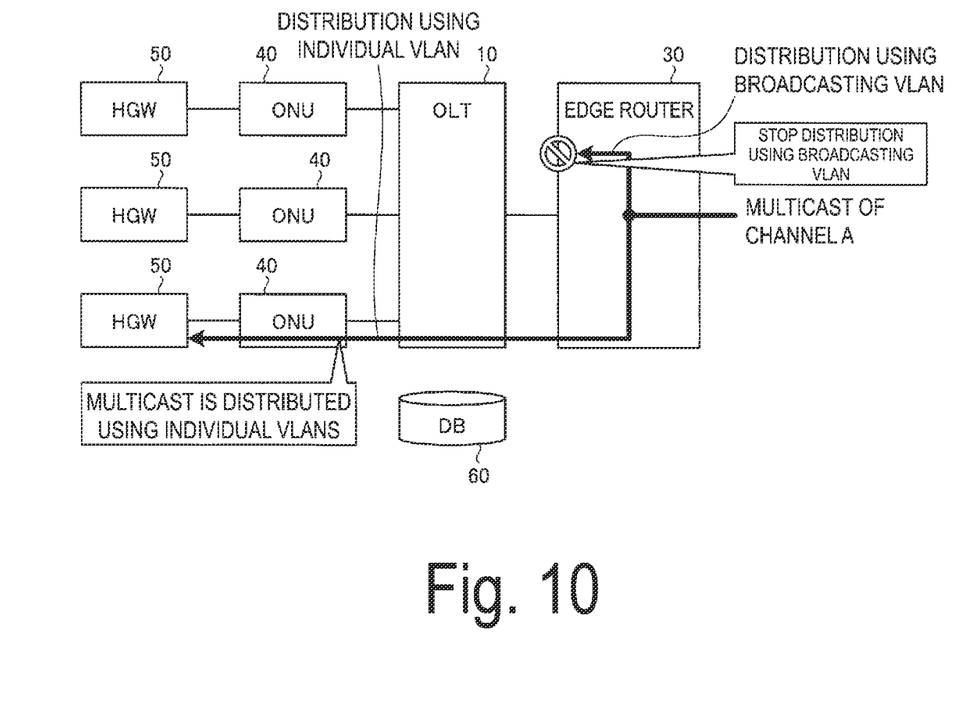
FIG. 10 is a diagram showing a process of performing switching from OLT copy distribution to edge copy distribution.

Next, a process of performing switching from OLT copy distribution to edge copy distribution will be described using FIGS. 8 to 10. FIGS. 8 to 10 show a process of performing switching from OLT copy distribution to edge copy distribution. As shown in FIG. 8, the OLT 10 closes a port of the ONU 40 and stops distribution when the viewing of the channel A is stopped during OLT copy distribution. In addition, the OLT 10 notifies the DB 60 that the viewing of the channel A has been stopped. As a result, it is assumed that the number of viewers of the channel A is less than the threshold value X.

Thereafter, as shown in FIG. 9, the DB 60 notifies the OLT 10 of a threshold value reduction notification when the number of viewers of the channel A is less than the threshold value X during the OLT copy distribution. When the OLT 10 receives the threshold value reduction notification from the DB 60, the OLT 10 requests the edge router 30 to stop distribution using a broadcasting VLA and requests a person continuing viewing to start viewing using an individual VLAN. In addition, as shown in FIG. 10, the edge router 30 stops distribution using a broadcasting VLAN, performs switching to distribution using an individual VLAN for a viewer, and distributes multicast using individual VLANs.

Flow of Processing of OLT

Figure 11:
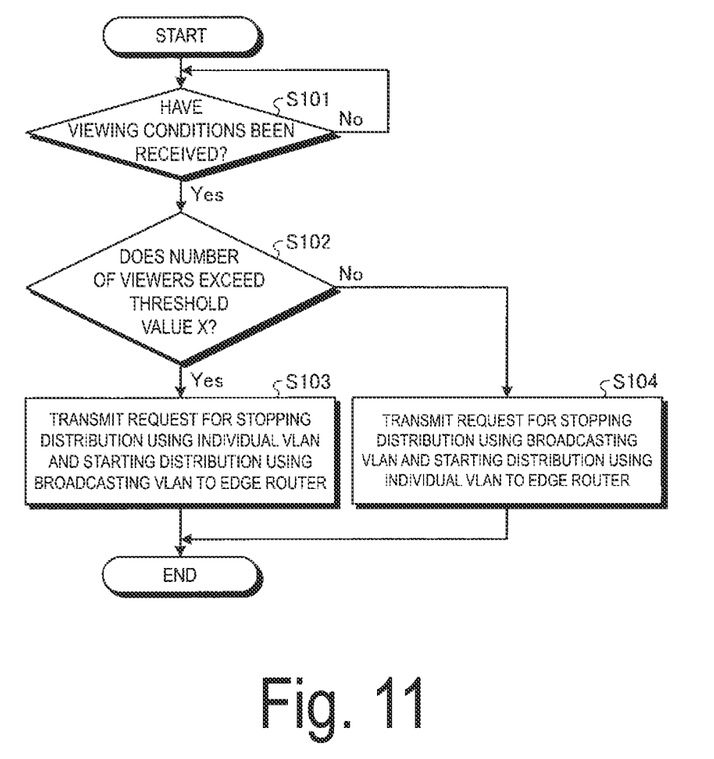
FIG. 11 is a flowchart showing processing using an OLT according to the first embodiment of the present disclosure.

Next, a flow of processing of the OLT 10 according to the first embodiment will be described using FIG. 11. FIG. 11 is a flowchart showing processing using an OLT according to the first embodiment.

As shown in FIG. 11, when the OLT 10 receives a notification related to viewing conditions from the DB 60 (affirmative in step S101), the OLT 10 determines whether or not the number of viewers exceeds the threshold value X (step S102). For example, in a case where the OLT 10 receives a threshold value excess notification indicating that the number of viewers of a channel exceeds the threshold value X from the DB 60, the OLT 10 determines that the number of viewers has exceeded the threshold value X (affirmative in step S102). In a case where the OLT 10 receives a threshold value reduction notification indicating that the number of viewers of the channel is less than the threshold value X, the OLT 10 determines that the number of viewers is less than the threshold value X (negative in step S102).

As a result, in a case where the OLT 10 determines that the number of viewers exceeds the threshold value X, the OLT 10 transmits a request for stopping distribution using an individual VLAN and starting distribution to a terminal by which viewing is continued using a broadcasting VLAN to the edge router 30 (step S103). Further, in a case where the OLT 10 determines that the number of viewers is less than the threshold value X, the OLT 10 transmits a request for stopping distribution using a broadcasting VLAN and starting distribution using an individual VLAN to the edge router 30 (step S104).

Effects of First Embodiment

In this manner, the OLT 10 according to the first embodiment detects content distribution conditions in each terminal and performs control for performing switching to distribution to each terminal using an individual VLAN or distribution to a plurality of terminals by broadcasting using a broadcasting VLAN, in accordance with the detected content distribution conditions. Specifically, the OLT 10 detects that the number of viewers of a predetermined channel exceeds a predetermined threshold value or that the number of viewers of the predetermined channel is less than the predetermined threshold value, as the content distribution conditions. Further, the OLT 10 performs switching to distribution using a broadcasting VLAN in a case where it is detected that the number of viewers of the predetermined channel exceeds the predetermined threshold value, and performs switching to distribution using an individual VLAN in a case where it is detected that the number of viewers of the predetermined channel is less than the predetermined threshold value.

Thereby, the OLT 10 can efficiently distribute content in accordance with viewing conditions. That is, it is possible to improve transfer efficiency by ascertaining viewing conditions in real time and performing multicast distribution by an appropriate transfer method in accordance with the number of viewers.

System Configuration and the Like

Components of the devices shown in the drawings are function conceptual components and do not necessarily need to be physically configured as shown in the drawings. That is, specific forms of distribution and integration of the devices are not limited to the forms shown in the drawings, and all or some of the forms can be configured by being functionally or physically distributed/integrated in any unit, depending on various loads, usage conditions, and the like. Further, all or some processing functions performed by the devices may be achieved by a CPU and a program analyzed and executed by the CPU, or may be achieved as hardware according to wired logic.

In addition, among the processes described in the present embodiment, all or some of the processes described as being performed automatically can also be performed manually, or all or some of the processes described as being performed manually can also be performed automatically by a known method. In addition, information including the processing procedures, the control procedures, the specific names, and various data and parameters described in the above-described document and drawings can be changed except for the case of special description.

Program

In addition, regarding the processes executed by the devices described in the above-described embodiment, a program described in a computer-executable language can also be created. For example, regarding the processes executed by the devices in the communication system according to the embodiment and the modification example, a program described in a computer-executable language can also be created. In this case, it is possible to obtain the same effects as those in the above-described embodiment by the computer executing the program. Hereinafter, an example of a computer that executes a program will be described.

Figure 12:
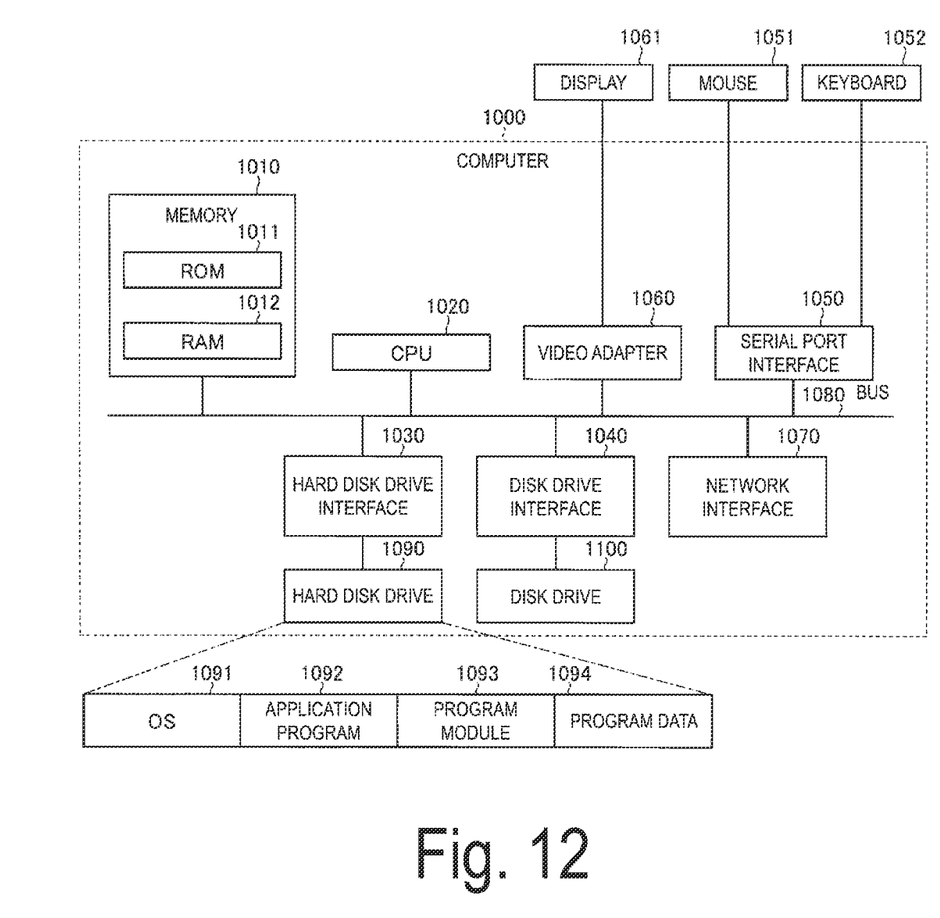
FIG. 12 is a diagram showing a computer that executes a program.

FIG. 12 is a diagram showing a computer that executes a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1051 and a keyboard 1052. A video adapter 1060 is connected to, for example, a display 1061.

The hard disk drive 1090 stores, for example, an OS 1091, an application program 1092, a program module 1093, and program data 1094. That is, a program specifying each process of each of the devices is implemented as a program module 1093 in which a computer-executable code is described. The program module 1093 is stored in, for example, the hard disk drive 1090. For example, the program module 1093 for executing processing similar to the functional configuration in the device is stored in a hard disk drive 1090. Note that the hard disk drive 1090 may be replaced with a solid state drive (SSD).

In addition, data used in the processing of the above-described embodiment is stored in, for example, the memory 1010 or the hard disk drive 1090, as the program data 1094. In addition, the CPU 1020 reads the program module 1093 and the program data 1094 stored in the memory 1010 and the hard disk drive 1090 to the RAM 1012 and executes them as necessary.

Note that the program module 1093 and the program data 1094 are not limited to being stored in the hard disk drive 1090, and may be stored in, for example, a detachable storage medium and read by the CPU 1020 through a disk drive 1100 or the like. Alternatively, the program module 1093 and the program data 1094 may be stored in another computer connected through a network or a WAN. In addition, the program module 1093 and the program data 1094 may be read by the CPU 1020 from another computer through the network interface 1070.

REFERENCE SIGNS LIST

10 OLT
11 Detection unit
12 Control unit
20 Content server
30 Edge router
40 ONU
50 HGW
60 DB

The invention claimed is:

1. A communication device comprising:
   a database device, including a memory device and at least one processor, configured to track a number of terminals that are connected to each of a plurality of channels;
   a detection unit, including at least one processor, configured to detect content distribution conditions in terminals based on a notification sent by the database device; and
   a control unit, including at least one processor, configured to perform control for performing switching to distribution to each terminal using an individual virtual local area network (VLAN) or distribution to a plurality of terminals by broadcasting using a broadcasting VLAN, in accordance with the content distribution conditions detected by the detection unit and the notification, wherein the notification comprises information that the number of terminals connected to a corresponding channel of the plurality of channels crosses a threshold.

2. The communication device according to claim 1, wherein
   the detection unit is configured to detect that a number of viewers of a predetermined channel exceeds a predetermined threshold value as the content distribution conditions, and
   the control unit is configured to request an edge router to start distribution using the broadcasting VLAN and stop distribution using the individual VLAN in a case where the detection unit detects that the number of viewers of the predetermined channel exceeds the predetermined threshold value and configured to notify the database device that distribution using the individual VLAN has been stopped.

3. The communication device according to claim 1, wherein
   the detection unit is configured to detect that a number of viewers of a predetermined channel is less than a predetermined threshold value as the content distribution conditions, and
   the control unit is configured to request an edge router to start distribution using the individual VLAN and stop distribution using the broadcasting VLAN in a case where the detection unit detects that the number of viewers of the predetermined channel is less than the predetermined threshold value, and configured to notify the database device that the distribution using the broadcasting VLAN has been stopped.

4. A switching method executed by a communication device, the switching method comprising:
   tracking, by a database device, a number of terminals that are connected to each of a plurality of channels;
   notifying, by the database device, a detection unit that a number of terminals connected to a corresponding channel of the plurality of channels crosses a threshold;
   detecting, by the detection unit, content distribution conditions in terminals based on the notification; and
   performing, by a control unit, control for performing switching to distribution to each terminal using an individual virtual local area network (VLAN) or distribution to a plurality of terminals by broadcasting using a broadcasting VLAN, in accordance with the content distribution conditions detected in the detecting of the content distribution conditions and based on the notification that the number of terminals connected to a corresponding channel of the plurality of channels crosses a threshold.

* * * * *